United States Patent [19]
Yamashita et al.

[11] Patent Number: 5,146,345
[45] Date of Patent: Sep. 8, 1992

[54] FOLDABLE ELECTRONIC PRINT BOARD WITH CENTRALLY LOCATED PRINTER FOR STABILITY

[75] Inventors: Atsushi Yamashita; Takeshi Nakayama, both of Fukuoka, Japan

[73] Assignee: Matsushita Electric Industrial Co., Ltd., Osaka, Japan

[21] Appl. No.: 784,535

[22] Filed: Oct. 29, 1991

[30] Foreign Application Priority Data

Oct. 29, 1990 [JP] Japan .................. 2-292300

[51] Int. Cl.⁵ .............................. H04N 1/10
[52] U.S. Cl. .......................... 358/297; 358/497; 434/408; 434/411
[58] Field of Search ............... 358/497, 296, 297, 254, 358/471, 474; 434/408–414, 416, 419, 429; 312/320, 321

[56] References Cited

U.S. PATENT DOCUMENTS

| | | | |
|---|---|---|---|
| 3,034,230 | 5/1962 | Windram | 434/408 |
| 4,587,568 | 5/1986 | Takayama et al. | 358/451 |
| 4,713,698 | 12/1987 | Takahashi et al. | 358/450 |
| 4,727,431 | 2/1988 | Nakamura et al. | 358/451 |
| 4,739,414 | 4/1988 | Pryor et al. | 358/482 |
| 4,744,762 | 5/1988 | Konsuvo | 434/412 |
| 4,797,107 | 1/1989 | Hatta et al. | 434/408 |
| 4,803,564 | 2/1989 | Sakai | 434/408 |
| 4,812,914 | 3/1989 | Isobe | 358/497 |

FOREIGN PATENT DOCUMENTS 0321113 6/1989 European Pat. Off.
0000966 1/1989 Japan .................. 434/408

*Primary Examiner*—Edward L. Coles, Sr.
*Assistant Examiner*—Jill Jackson
*Attorney, Agent, or Firm*—Pollock, VandeSande & Priddy

[57] ABSTRACT

A foldable electronic print board copies or records, on recording paper, various patterns of information, including letters, numerals, images, etc., which have been handwritten on a writing sheet. The foldable electronic print board has a pair of hinged cases housing the writing sheet, and a printer for printing the handwritten information on the recording paper. The printer is detachably mounted on the cases across the axis about which the print board is foldable, to keep the print board unfolded. Since the printer itself is used to hold the print board unfolded, no dedicated holder or holders are required to be fixed to the cases. The printer is located at the geometric center of the print board for thereby making the print board stable in use.

12 Claims, 4 Drawing Sheets

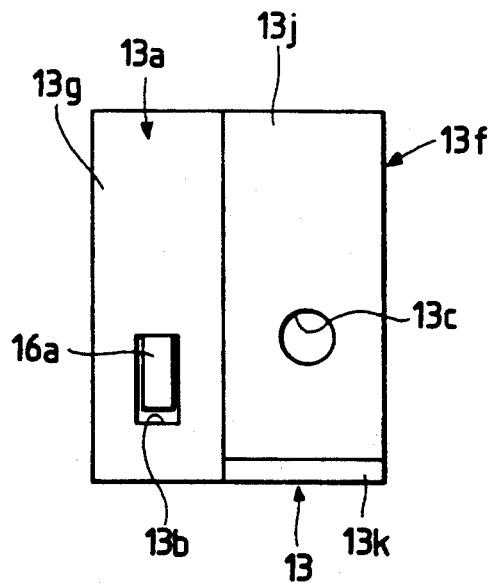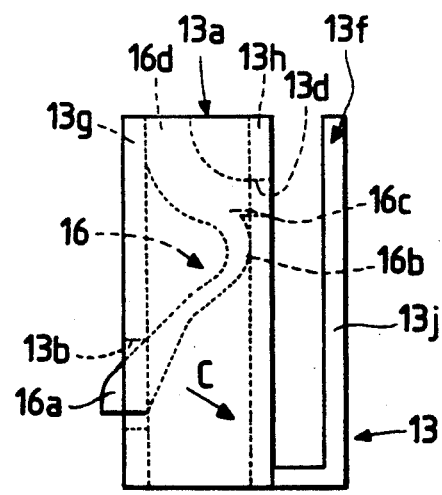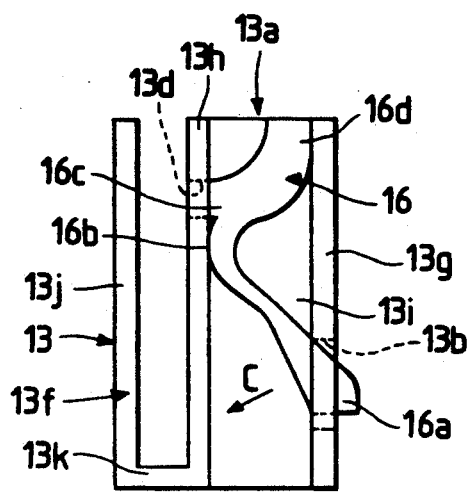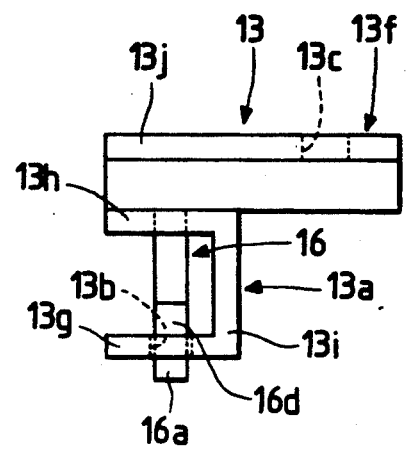

FOLDABLE ELECTRONIC PRINT BOARD WITH CENTRALLY LOCATED PRINTER FOR STABILITY

BACKGROUND OF THE INVENTION

1. Field of the Invention

The present invention relates to a foldable electronic print board capable of copying or recording, on recording paper, various patterns of information, including letters, numerals, images, etc., which have been handwritten on a writing sheet.

2. Description of the Prior Art

There have been developed and used electronic print boards for optically reading the information, in the form of letters, numerals, images, etc., which have been handwritten on a writing sheet, converting the read information into an electric signal, and copying the information on recording sheet using the electric signal. Such electronic print boards are finding widespread use particularly in meetings, conferences, lectures, and other opportunities for presentation because they can eliminate the need for the record of proceedings and also allow the attendants to have a copy of anything handwritten on the writing sheet.

One typical electronic print board includes a foldable board casing composed of a pair of hinged cases, and a printer fixed to one of the hinged cases. Since the printer is mounted on one of the cases, when the electronic print board is unfolded, the center of gravity thereof is positioned off the geometric center of the print board, making it unstable to use. When the electronic print board is in use, the board casing has to be kept in the unfolded state by a dedicated holder or dedicated holders that are fixed to the cases. Consequently, the number of components of the electronic print board is relatively large.

SUMMARY OF THE INVENTION

It is an object of the present invention to provide a foldable electronic print board which can be fixedly held in an unfolded condition by a printer of the board.

Another object of the present invention is to provide a foldable electronic print board which can be retained in an unfolded condition by a functional component of the board, so that the number of components of the board is relatively small.

Still another object of the present invention is to provide a foldable electronic print board which can be folded about a central axis thereof and which has a center of gravity positioned near the central axis, so that the foldable electronic print board remain stable when in use.

According to the present invention, there is provided a foldable electronic print board comprising a writing sheet for bearing handwritten information thereon, a board casing, the writing sheet being housed in the casing, the board casing being foldable about an axis located substantially at a center of the writing sheet, reading means, disposed in the board casing, for reading the handwritten information on the writing sheet, and printing means for printing the information read by the reading means on printing paper, the printing means being mounted on the board casing across the axis while the board casing is being unfolded, to prevent the board casing from being folded. The board casing comprises a pair of cases angularly movably coupled to each other by hinges disposed on the axis, and the printing means comprises a printer detachably attached to the cases across the axis.

The printer has at least two joints detachably mounted on the cases, respectively. The cases have respective holes defined therein, and the joints comprise respective insert members removably inserted in the holes, respectively, and side members disposed laterally of the insert members, respectively, and detachably fastened to the cases, respectively. The joints further comprise respective spring elements disposed in the insert members, respectively, the spring elements being resiliently engageable with the cases, respectively.

According to the present invention, there is further provided a foldable electronic print board comprising a writing sheet for bearing handwritten information thereon, a board casing, the writing sheet being housed in the casing, the board casing being foldable about an axis located substantially at a center of the writing sheet, reading means, disposed in the board casing, for reading the handwritten information on the writing sheet, and outputting means for outputting the information read by the reading means, the outputting means being mounted on the board casing across the axis to hold the board casing unfolded.

According to the present invention, there is also provided a foldable electronic print board comprising a writing sheet for bearing handwritten information thereon, a board casing, the writing sheet being housed in the casing, the board casing being foldable about an axis located substantially at a center of the writing sheet, printing means for printing the handwritten information on printing paper, the printing means being detachably attached to the board casing across the axis, and holding means for holding the board casing unfolded with the printing means mounted on the board casing.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a front elevational view of an joint for attaching the printer to one of the board cases;

FIGS. 5 and 6 are righthand and lefthand side elevational views of the joint;

FIG. 7 is a plan view of the joint;

DETAILED DESCRIPTION OF THE PREFERRED EMBODIMENT

Figure 1:
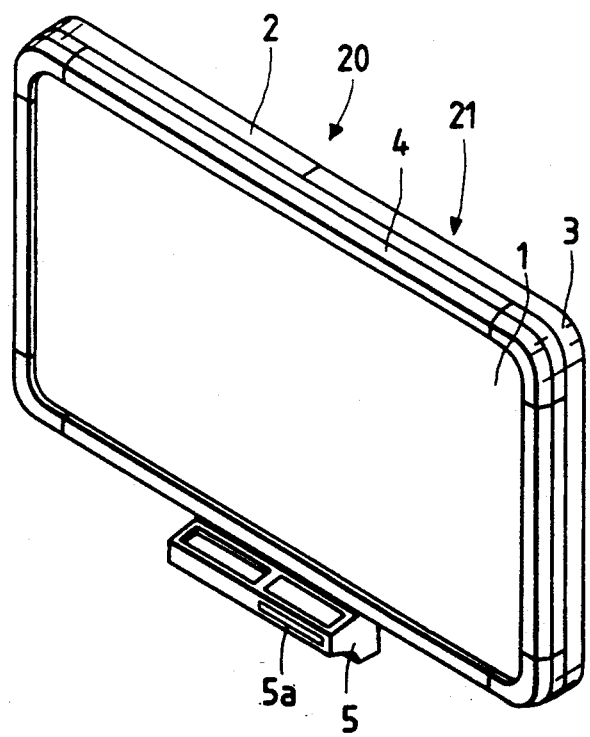
FIG. 1 is a perspective view of a foldable electronic print board according to the present invention, the view showing the board in an unfolded condition.
Figure 2:
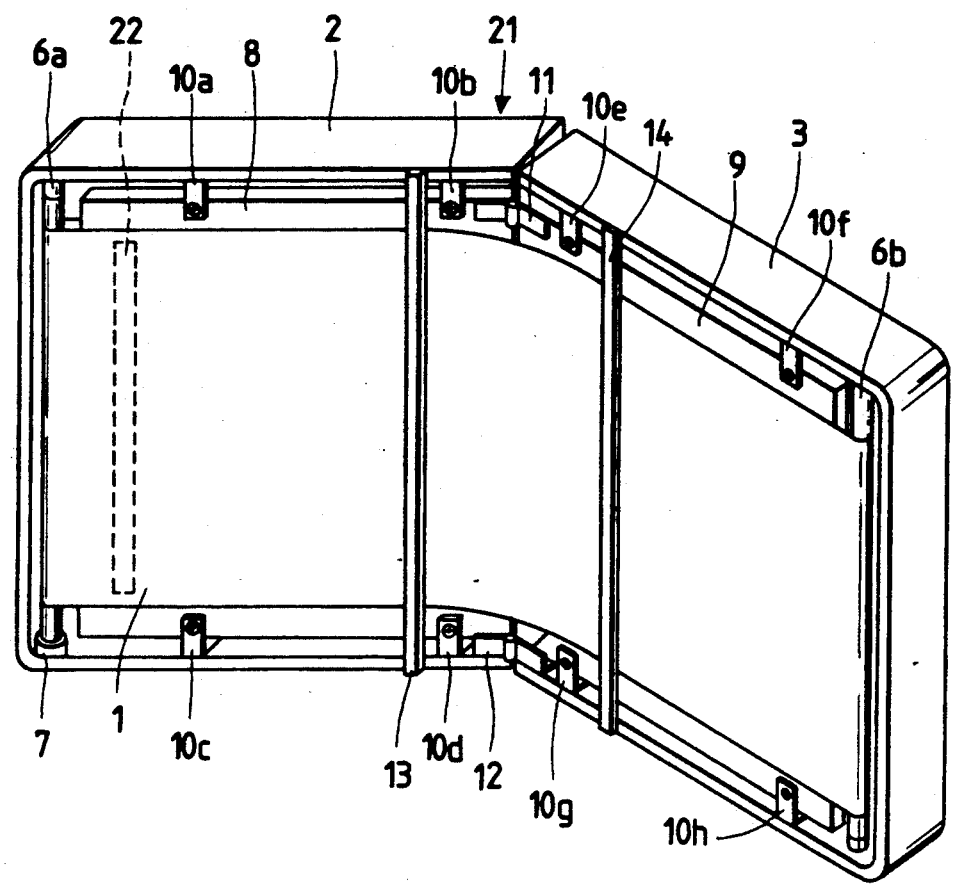
FIG. 2 is a perspective view of the foldable electronic print board, showing the board as it is partly folded.

FIGS. 1 and 2 show a foldable electronic print board according to the present invention.

As shown in FIG. 1, the foldable electronic print board 20 comprises an endless writing sheet 1 on which various patterns of information, including letters, numerals, images, etc., can be handwritten with a writing instrument such as a pin. The writing sheet 1 is housed in a board casing 21 comprising a pair of hinged cases 2, 3 that are shown unfolded in FIG. 1. A rectangular case frame 4 is coupled to the peripheral edges of the cases 2, 3. The foldable electronic print board 20 also includes a photoelectric reader 22 (see FIG. 2) disposed in the board casing 21, for optically reading information handwritten on the writing sheet 1. A printer 5 is detachably mounted on the cases 2, 3, and has a front paper outlet slot 5a for discharging printing paper 5 (see FIG. 2).

The foldable electronic print board 20 is shown partly folded in FIG. 2 with the case frame 4 and the printer 5 being omitted from illustration. As shown in FIG. 2, the endless writing sheet 1 is trained around a feed roller 6a rotatably mounted in the case 2 for feeding the writing sheet 1, and a driven roller 6b rotatably mounted in the case 2 and rotatable by the writing sheet 1 as it is fed by the feed roller 6a. The feed roller 6a is rotatable about its own axis by a motor 7 coupled to one end thereof. The cases 2, 3 accommodate respective holder plates 8, 9 therein that are positioned between opposite runs of the endless writing sheet 1. The holder plate 8 is fastened to the case 2 by L-shaped legs 10a, 10b, 10c, 10d, and the holder plate 9 is fastened to the case 3 by L-shaped legs 10e, 10f, 10g, 10h.

The cases 2, 3 are angularly movably connected to each other by hinges 11, 12 fastened to side edges thereof. The writing sheet 1 is held against the holder panels 8, 9 by retainer bars 13, 14 that are fixed to the cases 2, 3, respectively.

Figure 3:
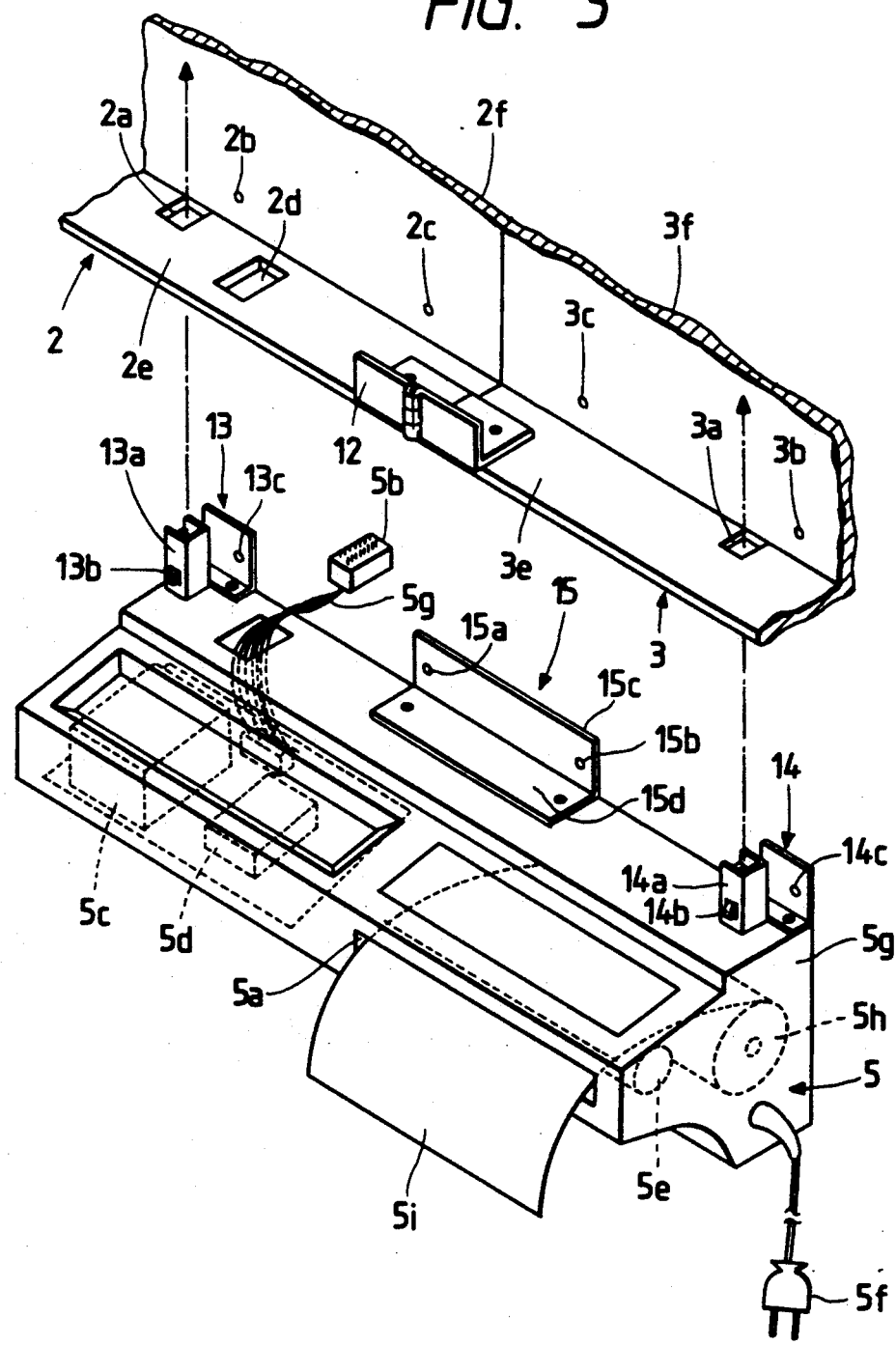
FIG. 3 is an enlarged fragmentary perspective view of a mechanism for attaching a printer to board cases.
Figure 8:
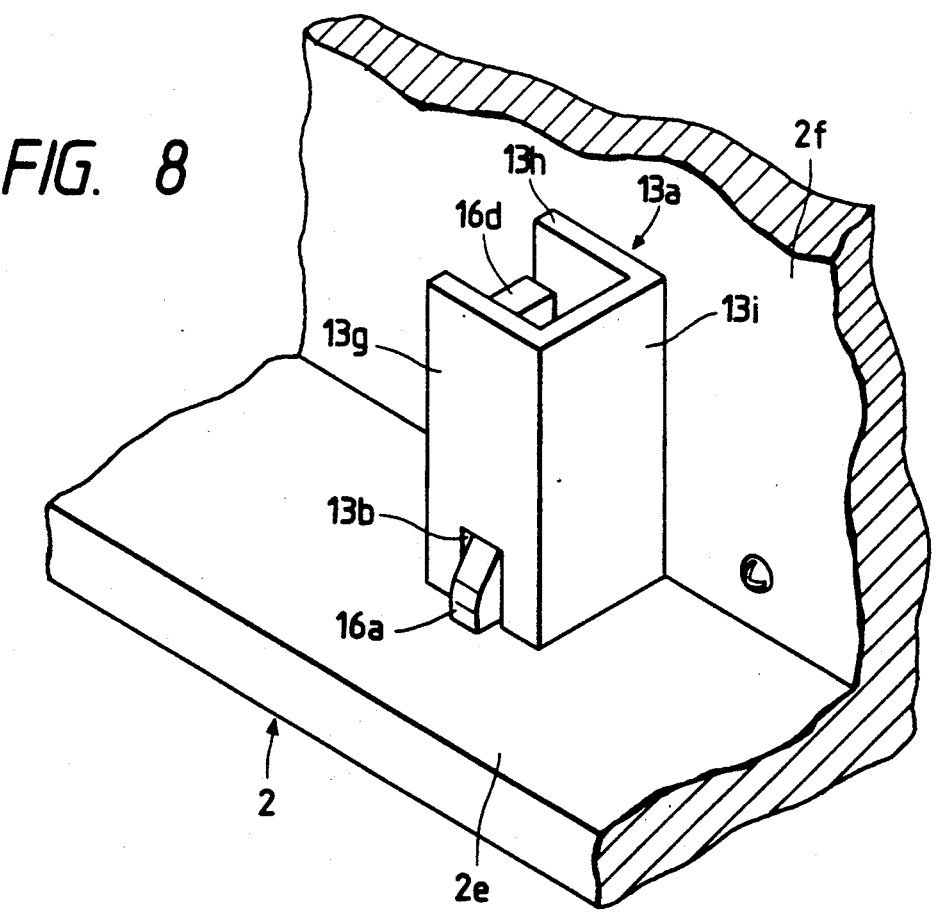
FIG. 8 is an enlarged fragmentary perspective view showing the joint by which the printer is attached to the board case.
Figure 9:
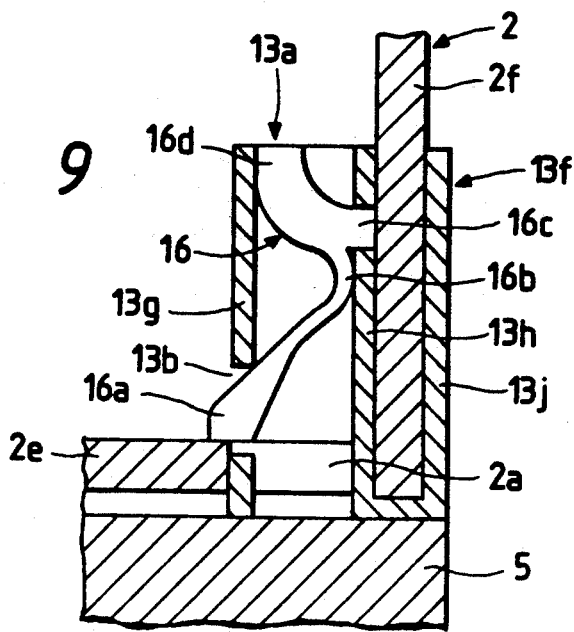
FIG. 9 is an enlarged cross-sectional view showing the joint by which the printer is attached to the board case.

As shown in FIG. 3, the printer 5 has a connector 5b, a printer mechanism 5e, a power source 5c including a transformer, and a control unit 5d for controlling the entire operation of the electronic print board 20. The connected 5b is connected to the control unit 5d by a cable 5g. The power source 5e can be connected to a commercial power supply by a plug 5f. The recording paper 5i is supplied from a paper roll 5h.

In FIG. 3, the case 2 has rectangular holes 2a, 2d defined in a lower horizontal flange 2e thereof, and the case 3 has a rectangular hole 3a defined in a lower horizontal flange 3e thereof. The case 2 also has screw holes 2b, 2c defined in a vertical panel 2f thereof, and the case 3 also has screw holes 3b, 3c defined in a vertical panel 3f thereof.

The printer 5 has a printer housing 5g with joints 13, 14, 15 mounted on an upper surface thereof. The joint 15, which is positioned centrally between the joints 13, 14, is of an L-shaped cross section and has screw holes 15a, 15b defined in a vertical flange 15c thereof. The joint 15 has a horizontal flange 15d fastened to the upper surface of the printer housing 5g. The joint 13, 14 are identical in structure to each other, and hence only the joint 13 will be described below.

As shown in FIGS. 4 through 7, the joint 13 comprises a channel-shaped insert member 13a and a side member 13f of L-shaped cross section disposed on one side of the insert member 13a. The insert member 13a has a pair of parallel spaced walls 13g, 13h interconnected by a wall 13i. The walls 13g, 13h, 13i are vertically elongate and mounted at lower ends on the upper surface of the printer housing 5g. The wall 13g, which is positioned remotely from the side member 13f, has a lower hole 13b defined therein. The wall 13h, which is positioned closely to the side member 13f, has an upper hole 13d defined therein, the upper hole 13d being positioned upwardly of the lower hole 13b. The side member 13f has a screw hole 13d defined in a vertical flange 13j thereof. The side member 13f also has a horizontal flange 13k joined to the wall 13h and mounted on the upper surface of the printer housing 5g. The joint 13 also includes a spring element 16 disposed in the channel-shaped insert member 13a and retained between the opposite walls 13g, 13h. The spring element 16 has an upper end 16d held against the inner surface of the wall 13g, a lateral protrusion 16c extending downwardly and laterally from the upper end 16d and fitted in the upper hole 13d, and a fulcrum 16b extending downwardly from the lateral protrusion 16c and held against the inner surface of the wall 13h. The spring element 16 also has a finger 16a on its lower end extending obliquely downwardly from the fulcrum 16b and movably disposed in the lower hole 13b. Normally, the finger 16a projects out of the wall 13g through the lower hole 13b. The finger 16a is resiliently movable back into the hole 13b about the fulcrum 16b in the direction indicated by the arrow C when pressed against the resiliency of the spring element 16.

As described above, the joint 14 is identical to the joint 13, and some components of the joint 14 which correspond to those of the joint 13 are denoted by the reference numeral 14 with the corresponding suffixes.

The foldable electronic print board 20 is assembled as follows:

The hinged cases 2, 3 are angularly moved away from each other into an unfolded condition. Then, the printer 5 is attached to lower edges of the cases 2, 3, and thereafter the case frame 4 is attached to the cases 2, 3. More specifically, the printer 5 is installed as follows: The cable 5g with the connector 5b coupled thereto is inserted through the hole 2d, and the insert members 13a, 14a of the joints 13, 14 are pushed into the respective holes 2a, 3a. The insert members 13a, 14a are inserted into the holes 2a, 3a until the fingers 16a of the spring elements of the insert members 13a, 14a are first pushed back into the holes 13b, 14b by the edges of the holes 2a, 3a, and then spring back into the holes 13b, 14b about the fulcrums 16b under the resiliency of the spring elements when the fingers move out of the holes 2a, 3a. When the fingers past the holes 2a, 3a, the fingers 16a resiliently snap into engagement with the upper surfaces of the horizontal flanges 2e, 3e of the cases 2, 3, thereby retaining the printer 5 on the cases 2, 3.

Thereafter, screws (not shown) are threaded into the screw holes 2b, 13c, the screw holes 2c, 15a, the screw holes 3c, 15b, and the screw holes 3b, 14c, thus securely fastening the printer 5 to the cases 2, 3.

The connector 5b is electrically connected to the photoelectric reader 22.

Since the printer 5 is connected to both the cases 2, 3 of the unfolded board casing 21, the printer 5 itself serves as a holder for holding the cases 2, 3 unfolded. Therefore, no additional member is required to keep the cases 2, 3 fixed in the unfolded state. As a result, the number of components of the foldable electronic print board 20 is smaller than if such an additional member were required.

Furthermore, the board casing 21 is foldable about its vertical central axis extending substantially at the geometric center of the writing sheet 1. Inasmuch as the printer 5 is positioned substantially centrally on the unfolded board casing 21, the center of gravity of the board casing 21 remains near the central axis thereof even when the printer 5 is mounted in position. Therefore, the foldable electronic print board 20 is highly stable when in use in the unfolded state.

The foldable electronic print board 20 which has been unfolded operates as follows: The user of the foldable electronic print board 20 handwrites desired information, which may be in the form of letters, numerals, images, etc., on an area of the writing sheet 1 with a pen or similar writing instrument. The writing sheet 1 is then fed by the feed roller 6a to move the handwritten area to the photoelectric reader 22, which then optically reads the information and converts it into an electric signal. The electric signal is then transmitted through the plug 5b and the cable 5g to the control unit 5d of the printer 5. The control unit 5d controls the printer mechanism 5e to print the information on the recording paper 5i, which is then discharged through the outlet slot 5a.

To disassemble the foldable electronic print board 20, the printer 5 is detached from the board casing 21, and then the board casing 21 is folded about the hinges 11, 12. Therefore, the electronic print board 20 can be compact in size when it is to be packaged or shipped.

Although a certain preferred embodiment of the present invention has been shown and described in detail, it should be understood that various changes and modifications may be made therein without departing from the scope of the appended claims.

We claim as our invention:

1. A foldable electronic print board comprising:
   a writing sheet for bearing handwritten information thereon;
   a board casing, said writing sheet being housed in said casing, said board casing being foldable about an axis located substantially at a center of said writing sheet;
   reading means, disposed in said board casing, for reading the handwritten information on said writing sheet; and
   printing means for printing the information read by said reading means on printing paper, said printing means being mounted on said board casing across said axis while the board casing is being unfolded, to prevent said board casing from being folded.

2. A foldable electronic print board according to claim 1, wherein said printing means being detachably attached to said board casing.

3. A foldable electronic print board according to claim 1, wherein said board casing comprises a pair of cases angularly movably coupled to each other by hinges disposed on said axis, said printing means comprising a printer detachably attached to said cases across said axis.

4. A foldable electronic print board according to claim 3, wherein said printer has at least two joints detachably mounted on said cases, respectively.

5. A foldable electronic print board according to claim 4, wherein said cases have respective holes defined therein, said joints comprising respective insert members removably inserted in said holes, respectively, and side members disposed laterally of said insert members, respectively, and detachably fastened to said cases, respectively.

6. A foldable electronic print board according to claim 5, wherein said joints further comprise respective spring elements disposed in said insert members, respectively, said spring elements being resiliently engageable with said cases, respectively.

7. A foldable electronic print board comprising:
   a writing sheet for bearing handwritten information thereon;
   a board casing, said writing sheet being housed in said casing, said board casing being foldable about an axis located substantially at a center of said writing sheet;
   reading means, disposed in said board casing, for reading the handwritten information on said writing sheet; and
   outputting means for outputting the information read by said reading means, said outputting means being mounted on said board casing across said axis to hold said board casing unfolded.

8. A foldable electronic print board according to claim 7, wherein said board casing has a feed roller for feeding said writing sheet over said reading means.

9. A foldable electronic print board according to claim 7, wherein said outputting means comprises a printer for printing the information read by said reading means on printing paper.

10. A foldable electronic print board comprising:
    a writing sheet for bearing handwritten information thereon;
    a board casing, said writing sheet being housed in said casing, said board casing being foldable about an axis located substantially at a center of said writing sheet;
    printing means for printing the handwritten information on printing paper, said printing means being detachably attached to said board casing across said axis; and
    holding means for holding said board casing unfolded with said printing means mounted on said board casing.

11. A foldable electronic print board according to claim 10, wherein said printing means has a power source.

12. A foldable electronic print board according to claim 10, further including reading means, disposed in said board casing, for reading the handwritten information on said writing sheet.

* * * * *